United States Patent
Reed et al.

(10) Patent No.: US 8,720,217 B2
(45) Date of Patent: May 13, 2014

(54) GALLEY COOLING HEAT SINK THROUGH WATER SYSTEM

(75) Inventors: Fred M. Reed, Brea, CA (US); Thomas M. Lee, Coto De Caza, CA (US)

(73) Assignee: MAG Aerospace Industries, Inc., Carson, CA (US)

( * ) Notice: Subject to any disclaimer, the term of this patent is extended or adjusted under 35 U.S.C. 154(b) by 550 days.

(21) Appl. No.: 11/775,762

(22) Filed: Jul. 10, 2007

(65) Prior Publication Data

US 2008/0087039 A1    Apr. 17, 2008

Related U.S. Application Data

(60) Provisional application No. 60/819,562, filed on Jul. 10, 2006, provisional application No. 60/832,208, filed on Jul. 20, 2006, provisional application No. 60/906,358, filed on Mar. 12, 2007.

(51) Int. Cl.
*F25D 15/00* (2006.01)
*B60H 1/32* (2006.01)

(52) U.S. Cl.
CPC ........................................ *B60H 1/32* (2013.01)
USPC .......................................................... 62/244

(58) Field of Classification Search
CPC ........................................................ F24D 5/04
USPC ............ 62/79, 199, 401, 402, 238.6, 434, 88, 62/62, 94, 244, 239, 498; 60/39.02, 39.07; 244/118.5; 165/41; 210/167; 429/12, 429/26, 513; 137/590.5
See application file for complete search history.

(56) References Cited

U.S. PATENT DOCUMENTS

| | | | | |
|---|---|---|---|---|
| 2,191,551 | A | * | 2/1940 | Ullstrand .......................... 62/489 |
| 2,653,014 | A | * | 9/1953 | Sniader .......................... 165/140 |
| 3,634,778 | A | | 1/1972 | Melikian |
| 4,014,179 | A | * | 3/1977 | Iles et al. ............................ 62/88 |
| 4,015,438 | A | * | 4/1977 | Kinsell et al. ...................... 62/88 |
| 4,034,571 | A | | 7/1977 | Bollinger |
| 4,263,786 | A | * | 4/1981 | Eng .................................... 62/87 |
| 4,671,077 | A | * | 6/1987 | Paradis ......................... 62/324.1 |
| 5,031,690 | A | | 7/1991 | Anderson et al. |
| 5,052,187 | A | * | 10/1991 | Robinson, Jr. ..................... 62/79 |
| 5,226,594 | A | | 7/1993 | Swenson |

(Continued)

FOREIGN PATENT DOCUMENTS

| | | |
|---|---|---|
| EP | 0 655 593 A | 5/1995 |
| EP | 1 538 078 A2 | 6/2005 |

(Continued)

OTHER PUBLICATIONS

International Search Report and Written Opinion in related International Application No. PCT/US07/084238.

*Primary Examiner* — Frantz F. Jules
*Assistant Examiner* — Emmanuel Duke
(74) *Attorney, Agent, or Firm* — Kilpatrick Townsend & Stockton LLP; Kristin M. Crall, Esq.; Dean W. Russell, Esq.

(57) ABSTRACT

There is provided systems and methods for transporting heat away from galley refrigeration equipment or other heat-generating systems such as avionics, power electronics, or in-flight entertainment units, via a potable water system. The potable water system transports heat more effectively and more efficiently than other systems used to date.

10 Claims, 10 Drawing Sheets

(56) References Cited

U.S. PATENT DOCUMENTS

| | | | |
|---|---|---|---|
| 5,307,642 A | 5/1994 | Dean | |
| 5,369,960 A * | 12/1994 | Mueller et al. | 62/238.6 |
| 5,402,967 A | 4/1995 | Hughes | |
| 5,461,882 A * | 10/1995 | Zywiak | 62/401 |
| 5,491,979 A | 2/1996 | Kull et al. | |
| 5,823,008 A * | 10/1998 | Nikai et al. | 62/401 |
| 5,970,729 A * | 10/1999 | Yamamoto et al. | 62/178 |
| 6,032,868 A * | 3/2000 | DiMarco | 237/8 R |
| 6,058,718 A | 5/2000 | Forsberg et al. | |
| 6,182,435 B1 * | 2/2001 | Niggemann et al. | 60/772 |
| 6,205,803 B1 * | 3/2001 | Scaringe | 62/259.2 |
| 6,272,873 B1 | 8/2001 | Bass | |
| 6,460,353 B2 * | 10/2002 | Udobot et al. | 62/86 |
| 6,525,431 B1 | 2/2003 | Clucas et al. | |
| 6,663,044 B1 * | 12/2003 | Munoz et al. | 244/118.5 |
| 6,684,648 B2 | 2/2004 | Faqih | |
| 6,880,351 B2 | 4/2005 | Simadiris et al. | |
| 6,926,069 B1 * | 8/2005 | Roffelsen | 165/70 |
| 7,059,148 B2 | 6/2006 | Ozaki | |
| 7,231,778 B2 | 6/2007 | Rigney et al. | |
| 2002/0046569 A1 | 4/2002 | Faqih | |
| 2003/0042361 A1 | 3/2003 | Simadiris | |
| 2003/0209345 A1 * | 11/2003 | Zweig | 165/154 |
| 2005/0061012 A1 | 3/2005 | Zywiak et al. | |
| 2005/0076661 A1 * | 4/2005 | Zywiak et al. | 62/244 |
| 2005/0092008 A1 | 5/2005 | Ozaki | |
| 2005/0115269 A1 | 6/2005 | Ozaki | |
| 2005/0210910 A1 * | 9/2005 | Rigney et al. | 62/407 |
| 2005/0235674 A1 | 10/2005 | Ozaki | |

FOREIGN PATENT DOCUMENTS

| | | |
|---|---|---|
| WO | WO 95/33166 | 12/1995 |
| WO | WO 2004/071974 A1 | 8/2004 |
| WO | WO 2004/074750 A2 | 9/2004 |
| WO | WO2005/094346 | 10/2005 |
| WO | WO-2008008324 A3 | 1/2008 |
| WO | WO-2008112029 A1 | 9/2008 |

* cited by examiner

DETAIL A

GALLEY COOLING HEAT SINK THROUGH WATER SYSTEM

This application claims the benefit of U.S. Provisional Application Ser. No. 60/819,562, filed Jul. 10, 2006 titled "Aircraft Galley Refrigeration Cooling Heat Sink through Water System," U.S. Provisional Application Ser. No. 60/832,208, filed Jul. 20, 2006 titled "Aircraft Heat Management System," and U.S. Provisional Application Ser. No. 60/906,358, filed Mar. 12, 2007 titled "Chiller and Refrigerant-to-Water Heat Exchanger Design," the entire contents of each of which are hereby incorporated by reference.

FIELD OF THE INVENTION

Embodiments of the present invention generally relate to systems and methods for transporting heat away from galley refrigeration equipment or other heat-generating systems such as avionics, power electronics, or in-flight entertainment units, via a potable water system.

BACKGROUND OF THE INVENTION

Food products for consumption onboard commercial aircraft are located in carts and compartments within the galley area of the aircraft. These areas must be refrigerated to satisfy the public health code. Aircraft, as well as other transport vehicles, present unique challenges to cooling these food carts or other areas that need to stay refrigerated or cooled. For example, space and weight limitations need to be considered, as well as noise and heat dissipation issues.

There are many systems currently used on aircraft and other passenger transport vehicles to refrigerate food items onboard. For example, one option is the use of refrigerators, which work much like household or commercial refrigerators. Refrigerators are not used for the majority of aircraft food cooling because of the great amount of space and labor that would be required to load and unload the food from between the carts and refrigerators on each flight. Another problem with refrigerators is that heat removed from the cooling compartment of the refrigerator is expelled directly to air in the galley. This can cause excess work for the air conditioning system of the aircraft to remove this heat. Another option is the use of dry ice. However, dry ice is short-lasting and thus provides insufficient refrigeration for longer trips. Other downsides are that dry ice is a recurring cost (it has to be re-loaded before each trip or flight) that requires extra manpower/labor to load, it adds to the weight of the vehicle, and it can cause safety concerns due to its very low temperature.

Split systems (vapor cycle) with the evaporator near the food or area to be cooled, and the compressor and condenser remotely located have also been used. The evaporator is typically either a coldplate in the refrigerated space or a heat exchanger relying on a fan to drive the airflow through the heat exchanger and chilled compartment. Split systems can be unreliable, and if they leak, the leak is at a joint or seal that needs to be repaired on the aircraft itself (i.e., it is not a line replaceable unit (LRU) that can be taken off the plane and replaced, while the defective unit is repaired elsewhere). Service can be very costly because the aircraft needs to be grounded for at least about eight hours.

Although the above-described systems are potential options, the two primary methods of refrigeration currently used on board commercial aircraft are chilled liquid systems and vapor cycle refrigerating units (also referred to as air chillers). For example, some current aircraft designs achieve galley cooling by using chilled liquid systems, which chill liquid centrally on the aircraft and pump the cold liquid throughout the aircraft. The liquid used is either Galden or a propylene glycol/water mixture (50%/50%). The liquid is chilled within a vapor cycle unit and circulated via a pump and tubing through a heat exchanger in the refrigerated compartment. Air is driven through the heat exchanger and over the food using a fan. This cools the air in the compartment and causes the liquid in the system to take on heat from the air in the compartment. After passing through the compartment, the liquid mixture is warmer than when it entered, and in order to cool the liquid back down for another pass through the refrigerated compartment, it is directed to the vapor cycle unit.

Both of the fluids used in chilled liquid systems are inferior to water as a heat transfer medium due their higher viscosity and lower specific heat. Additionally, Galden is approximately $400 per gallon, which can greatly increase the cost of using such a system. Another disadvantage of chilled liquid systems is that they involve a fairly complex series of pumps and tubing. Other drawbacks of a chilled liquid system include fluid leakage, low reliability due to its complexity, and perhaps most importantly, its weight, an issue of primary concern in aircrafts. Additionally, chilled liquid systems have historically been failure prone, and since they are an interconnected system, if one component fails, it is likely that most or all of the refrigeration is lost on the aircraft. This makes maintenance more complicated because the entire system must be checked and adjusted whenever any one component is replaced. As discussed above, any maintenance that must be conducted on an aircraft system (versus on a part that can be removed, replaced, and repaired in a workshop off-site) is very costly.

One advantage of a chilled liquid system (as opposed to the air chillers discussed below) is that the rejected heat from the chilled compartments can be dissipated in spaces away from the galley. By contrast, typical air chiller designs expel heat from the chiller near (or in or above) the galleys and create excess heat in these areas, resulting in undue strain on the air conditioning system or requiring complicated ducting to remove the heat.

Turning now to air chillers (also referred to as vapor cycle refrigerating units), air chillers are a self-contained refrigeration unit that function much like a wall air conditioner. The evaporator and condenser heat exchangers, compressor, fans, valves, plumbing, and controls are all contained within one unit. The unit is placed near the chilled galley, and the chilled air is ducted in and out of the chilled compartment. This design is still used in the majority of large commercial aircraft today. It has been preferred because of the modular nature of an air chiller—if an air chiller fails, it is removed and replaced without any impact on a larger system. Furthermore, the working fluid of an air chiller is air. If a duct seal is not installed correctly, or degrades over time, the loss of a small amount of chilled air makes the system slightly less efficient, but does not render the system inoperable.

One primary drawback of air chiller units, however, is that heat is rejected near the point at which they are installed. This can limit installation design because the units must be installed near the chilled compartments, yet they dissipate heat in the same area. The space near a galley is normally filled with other equipment and is not ideal for dissipating heat. The dissipated heat puts an additional load on the ECS (Environmental Control System) equipment, which causes inefficiency. Additionally, the galleys are near passengers, and noise from the air chiller fan and compressor can cause passenger complaints. Accordingly, the airflow used for the discharge heat must often be ducted some distance away from a chiller for heat and/or noise control, which puts an additional load on the chiller fan and requires additional space in the aircraft for the ducting. The ducting used for the chilled air and the condenser air is much larger than the tubing used for chilled liquid systems, and can be as large as six to eight inches in diameter. It can thus be challenging to locate this ducting within the aircraft system.

Although potable water systems have been tangentially suggested for use as a liquid coolant or for use in conjunction with a liquid cooled condenser, those applications describe a point-of-use heat exchange system, meaning that the system is placed in the galley food cart area. This adds to the above-described space considerations and challenges.

Accordingly, there is a need for an improved galley cooling system for aircraft or other transport vehicles that can efficiently cool a food cart or other compartment or device. Beneficial features of such an improved system are that it be low in weight, cost, and complexity, and high in efficiency, reliability, and ease of repair.

SUMMARY

Embodiments of the present invention provide systems and methods for cooling food carts or other devices on a transport vehicle using a potable water system. The potable water system transports heat more effectively and more efficiently than other systems used to date. In various systems according to the present invention, heat generated by one system of the vehicle is transferred to a remotely-located vapor cycle refrigerating unit, and water from the potable water system absorbs heat generated in the post-refrigeration stage (from the high pressure refrigerant) and transports the heat elsewhere on the vehicle.

In one embodiment, the invention provides a method for transporting heat from a chilled area on a vehicle to a remotely-located vapor cycle refrigeration unit on the vehicle, then transporting the heat via a potable water system to another location in the vehicle. The vehicle may be an aircraft and water in the potable water system transfers heat away from galley refrigeration equipment and transfers the heat to air that leaves the aircraft.

In another embodiment, the invention provides a system for performing cooling of a compartment or device on a transportation vehicle, comprising
(a) a vapor cycle refrigerating unit located remotely from the compartment or device to be cooled;
(b) an air ducting line that transports chilled air from the vapor cycle refrigerating unit to the compartment or device;
(c) a return air ducting line that transports warmed air back to the vapor cycle refrigerating unit;
(d) a supply line that directs water from a potable water tank to the vapor cycle refrigerating unit; and
(e) a system in the vapor cycle refrigerating unit that directs heat from the warmed air into the potable water, such that the water leaves the vapor cycle refrigerating unit at a higher temperature than at which it entered.

There may also be provided a supply line that transports the heated potable water leaving the vapor cycle refrigerating unit to an air to water heat exchanger that collects air from other areas on the transportation vehicle, wherein the air absorbs heat from the potable water such that the air increases in temperature, and wherein the heated air is expelled from the vehicle.

Further embodiments relate to a method for transferring heat on a vehicle, comprising:

(a) a first transfer of heat from air leaving a first area to a vapor cycle refrigerating unit located remotely from the first area;
(b) a second transfer of heat, wherein boiling of a liquid refrigerant extracts heat from the air;
(c) a third transfer of heat comprising a compression stage, wherein refrigerant vapor travels to a compressor that pressurizes the refrigerant vapor from a lower pressure to a higher pressure;
(d) a fourth transfer of heat, wherein high pressure refrigerant vapor travels to a heat exchanger that condenses the refrigerant vapor; and
(e) a fifth transfer of heat, wherein heat from the condensed refrigerant is transported to potable water.

There may also be provided (f) a sixth transfer of heat, wherein heat from the potable water is transferred to air from other areas on the vehicle and is expelled from the vehicle.

DETAILED DESCRIPTION OF THE INVENTION

Figure 1:
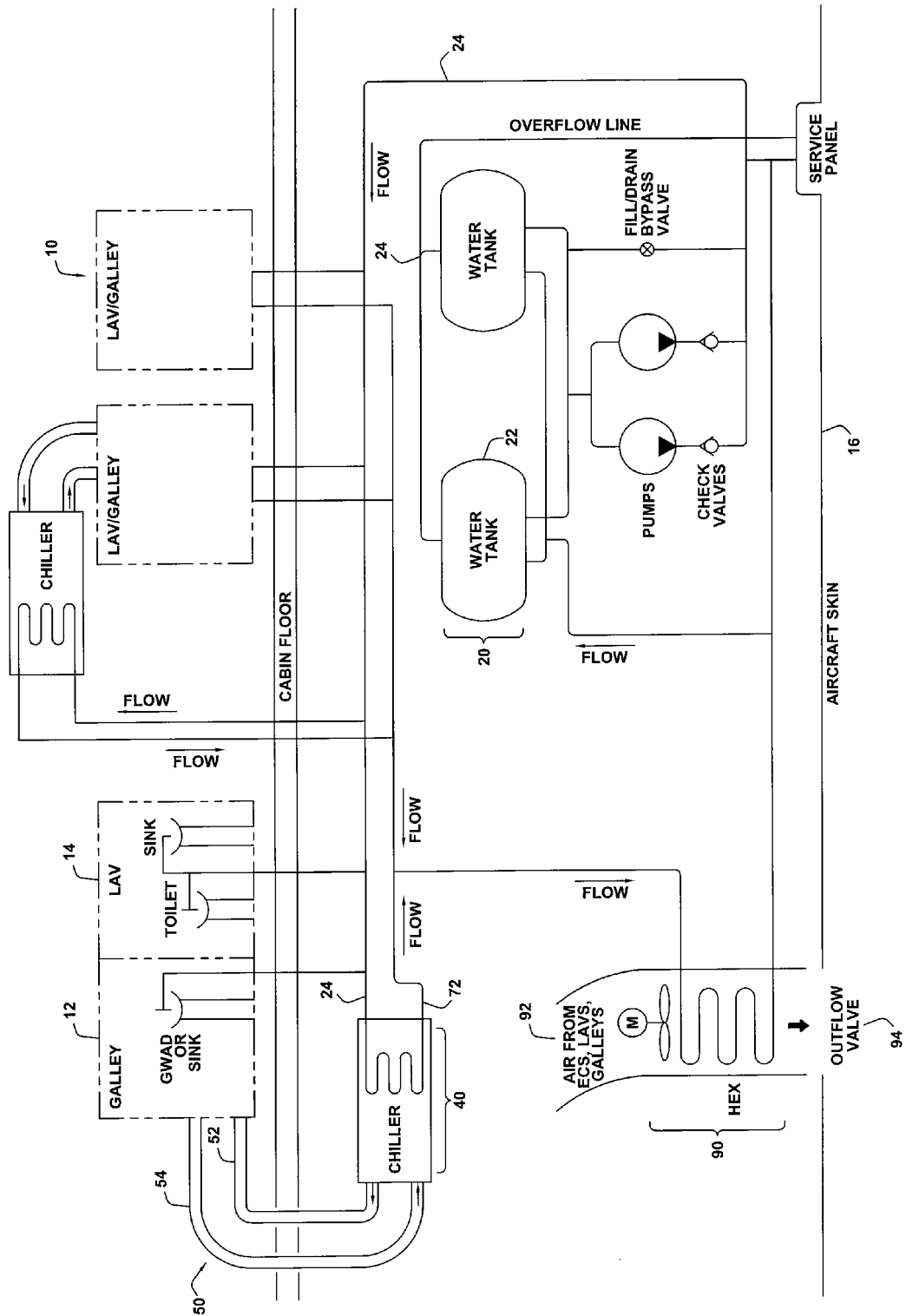
FIG. 1 shows a flow diagram of a cooling system according to one embodiment of this invention.

Embodiments of the present invention relate to systems and methods for cooling various compartments, systems, and devices of transport vehicles. For example, food products to be served to passengers onboard aircraft are traditionally kept cool in compartments through chilled recirculated air. Other devices, such as electronics, avionics, or other systems that generate heat, may also need to be cooled. For ease of reference, this invention will be described with respect to aircraft galley refrigeration systems for cooling food products in food carts or compartments, but it should be understood that it is equally applicable to other transport vehicles, such as large passenger buses, watercraft, etc., and may be used to cool systems other than food compartments, such as power electronic units, avionics, in-flight entertainment units, and any other heat-generating equipment that may need to be cooled.

The designs described in this application generally use a potable water system and a vapor cycle refrigerating unit (also referred to throughout as an air chiller system), both of which are typically already in place on an aircraft, as a heat transfer system in order to remove heat from galley cooling equipment, such as food carts and the like, and transport the heat outside of the aircraft. The use of these pre-existing systems provides a number of benefits. First, and perhaps most important, is the benefit of weight reduction. A potable water system and air chiller system already exist on typical commercial aircraft. This invention synergistically merges the two existing systems to take advantage of the resultant weight reduction. Adding minimal additional piping, pumps, and controls to cycle the water continuously through the current air chillers adds little weight to the overall system. Furthermore, the ECS system load will decrease over the current design using an air chiller only, allowing for a reduction in the size of the ECS equipment.

A second benefit is the replacement of freeze protection equipment. The typical water system must have heaters and insulation to prevent freezing in-flight. The circulating warm water of embodiments of this invention results in an electrical power reduction and an increase in reliability. A potential disadvantage may be some erosion of the piping due to the continuous water circulation, however the water supply lines may be treated to account for potential erosion.

Third, the present system provides greater energy efficiency. The thermal inertia of several hundred gallons of water in the potable water system allows operation of systems such as galley cooling and power electronics on ground for up to about two hours without ECS system operation and without outflow fan operation.

Fourth, the system provides increased reliability. One of the advantages of this design is a dramatic increase in reliability over the liquid chill and split systems, which are subject to leakage due to multiple joints. Glycol/water mixtures tend to produce crystals and other solids that cause the seals in quick disconnect joints to leak. Since glycol/water mixtures do not evaporate readily, soaked galley floors and leaks into storage bays under the floor and into sensitive electronics can be common with these older systems.

An additional important advantage of this system is the lower cost of the initial equipment as well as the low cost of ownership over time.

Moreover, although Galden (a fluid used more recently) evaporates quickly, thereby eliminating the cleaning required when the inevitable leak occurs, its use raises two new issues. Once the Galden fluid leaks, the system is inoperative. Galden is also quite expensive and creates a very high cost of ownership. The solution to leaking Galden was to eliminate all of the joints in the tubing system. However, installing and repairing one very long section of tubing rather than multiple sections with joints adds additional cost to the aircraft manufacturer and airline.

A further benefit of the systems described herein is that the primary components of the cooling system can be installed remotely from where the food needs to be chilled or from where the heat-generating device is located. This allows the cooled and warmed air to be ducted to and from the location of interest, and the vapor cycle refrigerating unit can be installed below a cabin floor or elsewhere on the vehicle, where space is not at as high a premium as it is in the galley area.

The water based approach described herein resolves the problems of other fluid systems. Potable water systems have been in use on all commercial aircraft for over thirty years. Installation, joint design, and leak problems have all been worked out. Of course, leaks have not been completely eliminated, but they are anticipated and effective solutions are already in place. In any area where a leak may occur and where there is sensitive equipment, steps are taken to ensure that no safety or reliability issues will occur. If a small leak occurs, there is an ample reservoir of water stored in the water tanks. Furthermore, water is typically uploaded on to aircraft at the end of each day, at a minimum. Therefore, the cooling system described herein will not become inoperative due to a water leak.

Referring now to a specific embodiment of the invention, FIG. 1 shows an example of the flow of potable water and air through a galley cooling system 10. The main components of galley cooling system 10 are a potable water system 20 and a vapor cycle refrigeration unit (also referred to as an air chiller system) 40 installed remotely from the galley. During flight, cool air from the air chiller system 40 is delivered to the galley 12 via air flow lines 50 (also referred to as air ducting) that leave and return to the air chiller system 40. For example, FIG. 1 shows an air ducting line 52 leaving air chiller 40 and a return air ducting line 54 returning back to the chiller 40. The air in ducting line 52 may be, for example 30° F. The cool air is directed to the desired location, i.e., the galley equipment (e.g., cooled food compartment) or any other equipment that is intended to be cooled (e.g., any device that generates heat). Warm air (e.g., air that has been removed from the cooled food compartment) is then directed back to the air chiller 40 via return ducting line 54. This air may have been warmed to, for example, 38° F.

In order to cool this air back down for another cycle through the galley equipment, heat from the warmed air is transported through the vapor cycle refrigerating unit 40 (described in more detail below) that is installed remotely from the galley equipment, and ultimately to potable water that runs through potable water system 20. The potable water system 20 comprises potable water that is stored in water tanks 22 from which flow through a series of water supply lines 24. Aircraft and transport vehicles typically have these tanks 22 and supply lines 24 already in place in order to supply potable water to galleys 12 and lavatories 14. The system 20 is typically installed under the cabin floor and through its walls.

In use, water in the supply lines 24 runs through vapor cycle refrigerating unit/air chiller 40 and absorbs heat from the high pressure refrigerant, which has absorbed heat from the warmed air returning from the galley 12. In one example, potable water may enter air chiller 40 at about 90°F., and once it absorbs the excess heat from the air (via the refrigeration compression cycle), it exits the chiller 40 at about 100° F. The heated water may then be directed to another system 90 (discussed below) that transports excess heat from the water to air that is to be expelled from the aircraft. This is what is referred to as a high side heat sink.

Referring now in more detail to the vapor cycle refrigerating unit/air chiller system 40, in contrast to the typical air chillers described above, which reject heat into air near where the unit is installed or need to have the heated air ducted away from the unit (and outside the aircraft) by a special and separate air duct system, the air chiller system 40 used in accordance with this invention directs the rejected heat to water in the potable water system 20. This is more efficient than the heat dissipation used by typical air chillers because the potable water system 40 already has water supply lines 24 in place, such that no additional ducting or heat absorption systems are needed. This greatly reduces the weight of the cooling system 10, and also makes its implementation less expensive and more efficient than other systems being used.

Figure 10:
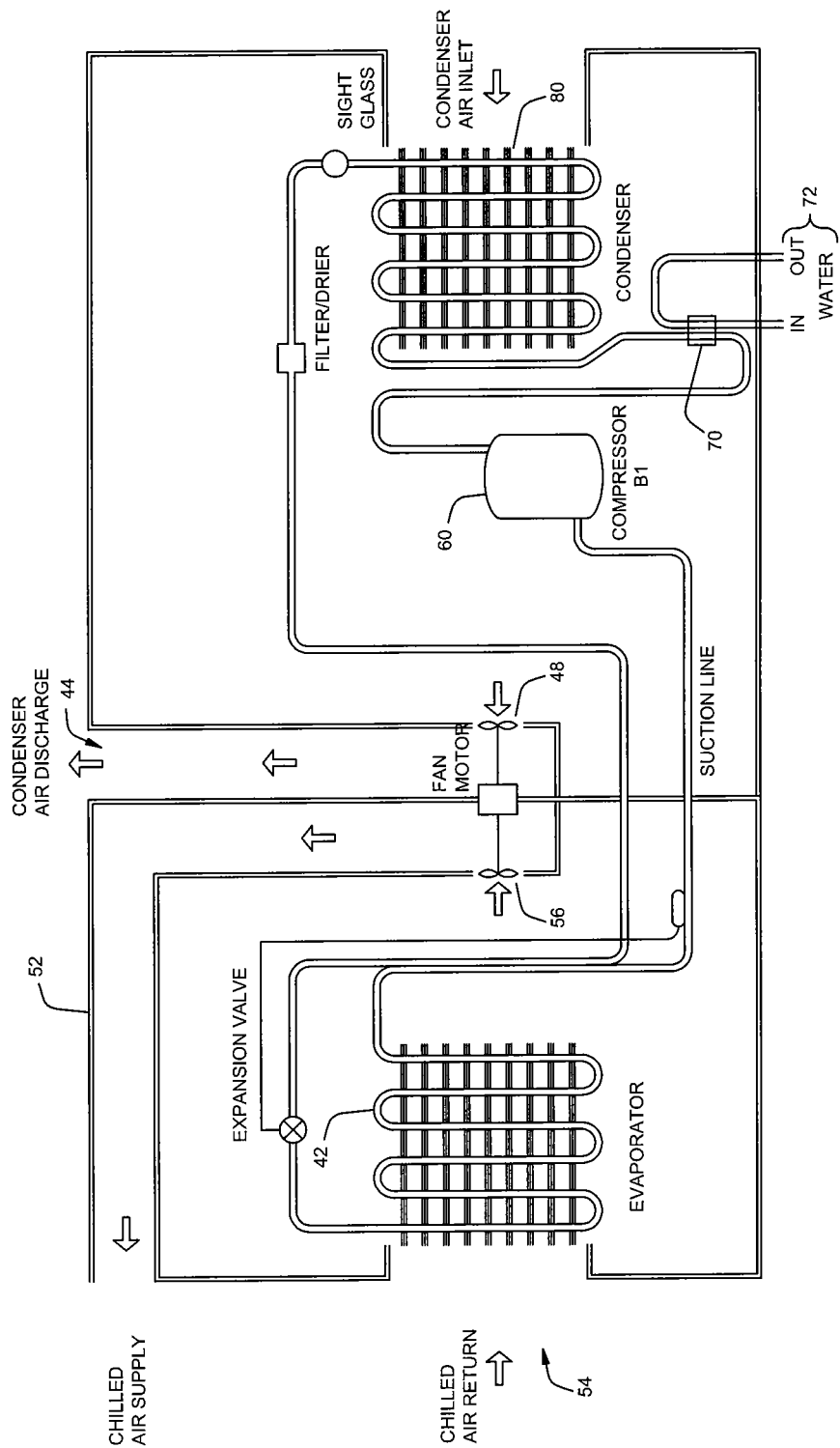
FIG. 10 shows a detailed view of the air chiller of FIG. 1.

FIG. 10 shows an example detailing the flow of air and water through an exemplary air chiller 40 according to one embodiment of the invention. Warmed air returning from the galley through return air ducting line 54 is directed to the remotely-located chiller 40 and is blown across an evaporator 42. The evaporator 42 uses the boiling of liquid refrigerant to extract heat from the air and to thereby cool the air. Once the air has been re-chilled, it is re-circulated back to the food compartment by air ducting line 52 and fan 56. Warmed air may either leave the air chiller 40 through a condenser air discharge 44 as shown in FIG. 10 (which illustrates the embodiment shown in FIG. 2, in which the chiller 40 may reject heat to either the air or the water) or leave only through the water system 20 (as shown in FIG. 3).

The refrigerant vapor then travels to a compressor 60 that pressurizes the refrigerant from a lower pressure to a higher pressure. Refrigerant leaving the compressor 60 at a higher pressure is then directed to a heat exchanger 70. The heat exchanger 70/condenser 80 system takes heat out of the refrigerant by condensing the refrigerant and transports it to the potable water entering the air chiller system at the water in/out area 72. Transporting heat to the water that is already necessary and onboard the aircraft provides an efficient way to manage heat that is generated onboard an aircraft.

The water being used in this system is thus at a temperature higher than the temperature at which water freezes, because it is not being used as a liquid coolant, but instead as a high side heat sink. In specific embodiments, the temperature of the water is at or above ambient temperature, which may be considered the temperature of the ambient air typically experienced in an aircraft cabin. It is understood that such temperatures may vary greatly, and may be from anywhere slightly above freezing to anywhere below temperatures too extreme for human survival. In some specific embodiments that are meant as non-limiting examples only, the temperature may range from about 33° F. to about 120° F., more specifically from about 60° F. to about 100° F., and even more specifically from about 70° F. to about 90° F.

Referring back to FIG. 1, the warmed water leaving the water in/out area 72 is then transported through water supply lines 24 to an air-to-water heat exchanger 90 in order to transfer the heat outside of the aircraft. The air 92 that is blown through this heat exchanger 90 comes from the galley and lavatory areas as well as other areas in the aircraft. These are spaces that are conditioned by the ECS, and are separate from the food handling compartments. The air 92 being blown into this heat exchanger 90 absorbs excess heat from the potable water in supply line 24; in essence, it takes the warmed water and transfers heat to air. After passing through the air-to-water heat exchanger 90, the warmed air leaves the aircraft through an outflow valve 94 that penetrates the aircraft skin 16. As the potable water leaves the heat exchanger 90, it has been cooled and travels back up to the water tanks 22, where the process may begin again. In short, the potable water is used for heat transport—it absorbs heat from air leaving galley equipment via an air chiller, and carries the heat to another system 90 that transports heat from the water to air that will be exiting the aircraft anyway.

Figure 2:
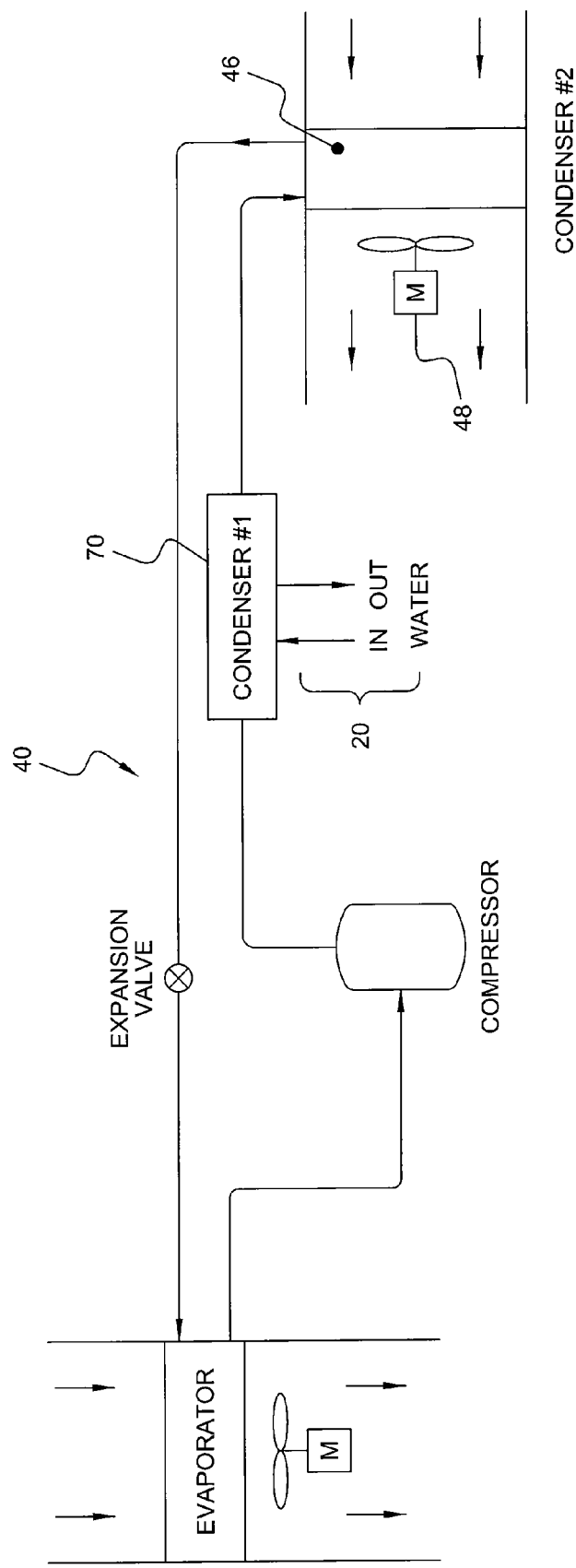
FIG. 2 shows a system with a vapor cycle refrigerating unit (or air chiller) that uses a condenser heat exchanger with a water in/out system, as well as an air cooled condenser.
Figure 3:
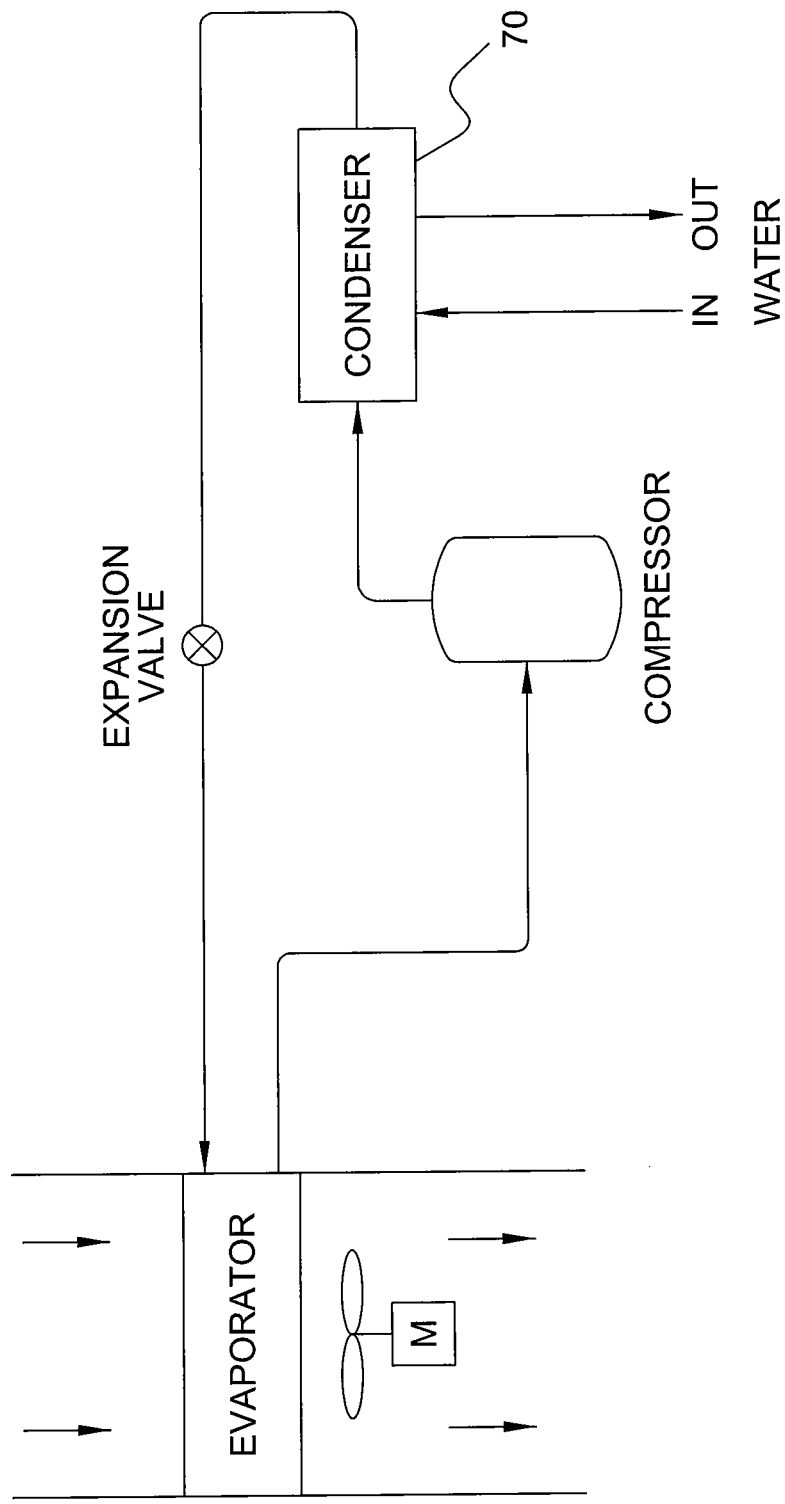
FIG. 3 shows the system of FIG. 2 without the air cooled condenser.

As shown in FIG. 2, one embodiment of the air chiller 40 may use both a refrigerant-to-water heat exchanger 70, discussed above, as well as an air cooled condenser 46 (also referred to as an "air flow sink").

This design allows the waste heat (heat of rejection) to be transferred away from the chiller unit 40 through either the water system 20 or through local air flow. The air flow sink 46 could be used as a backup prior to, or during water being loaded onto the aircraft. Additionally, the air flow sink 46 could be used in case of failure of the water system 20. This redundancy may help increase the overall reliability of the cooling system 10. The balance between these two heat sinks may be simple to obtain—the fan 48 of the air flow sink 46 could be thermostatically operated to work only if the liquid sink (i.e., the heat exchanger 70) is not providing enough cooling. If the water system is working, the fan 48 would not be turned on and there would be no heat discharged into the local environment.

The liquid and air condensers could be plumbed in series. The fan motor 48 used to drive air through the air cooled condenser may be provided with speed control. If heat needs to be discharged into the local area, the fan can speed up. If the heat needs to go entirely into the water system, the fan can stop. This allows the proportion of heat carried off through the water system versus the amount of heat discharged into the local area to be controlled thermostatically or through a microprocessor.

An alternate embodiment shown in FIG. 3 provides a refrigerant-to-water heat exchanger 70 that completely replaces the air cooled condenser currently used in most aircraft applications. This design uses only a liquid cooled condenser (the heat exchanger 70) rather than being coupled with a traditional air cooled condenser. This helps reduce weight and space, although it does not allow for backup cooling in case water is not available.

Figure 4:
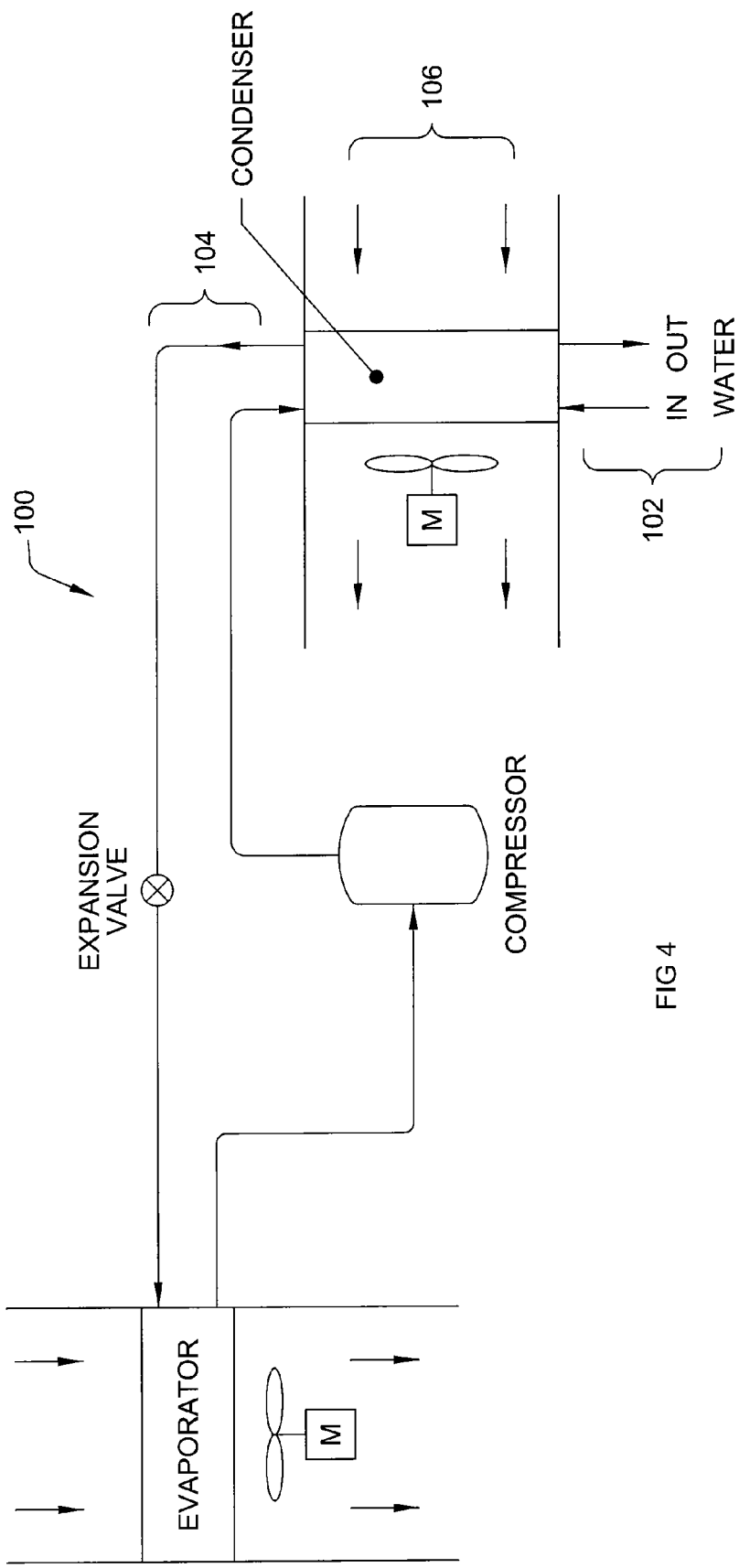
FIG. 4 shows a system with a hybrid heat exchanger that uses water, refrigerant, and air in an integrated unit.

A further embodiment shown in FIG. 4 provides a hybrid heat exchanger 100 that can cool the refrigerant with either water or air, all within one integrated unit. This design uses a heat exchanger 100 that has passages for water 102 and refrigerant 104, with cross passages 106 for air. In this design, either water or air can be the medium for condensing the refrigerant. An assembly based on the widely used BAM (Brazed Aluminum Microchannel) coil condenser could be the design fundamental of this heat exchanger 100. Alternately, plate/fin heat exchanger technology could be used for this assembly.

Figure 5:
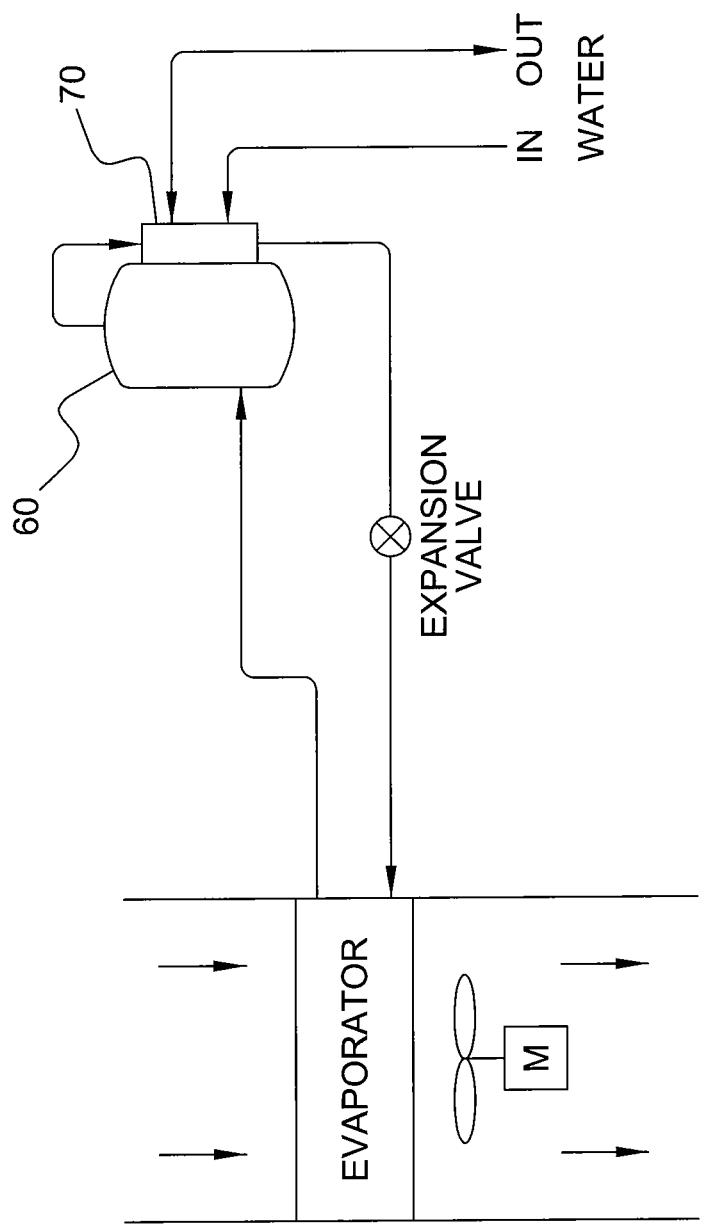
FIG. 5 shows a system with a compressor having a heat exchanger mounted thereto to provide cooling to the compressor.
Figure 9:
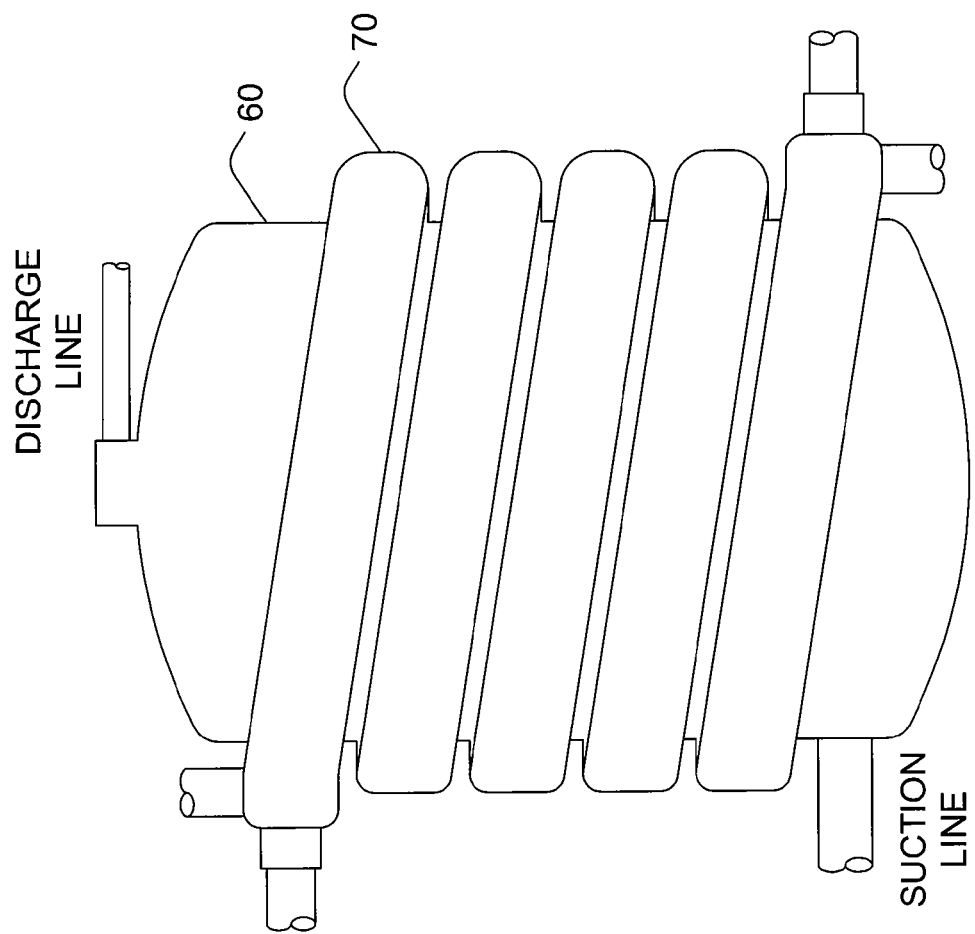
FIG. 9 shows an example of one embodiment of a heat exchanger system that is integral with and wrapped around a compressor.

An even further embodiment shown in FIG. 5 provides a refrigerant-to-water heat exchanger 70 attached to the exterior of a compressor 60. This configuration can also provide cooling to the compressor 60, as well as use the potable water system to absorb excess heat from galley equipment. A more detailed view of one embodiment of this design is shown in FIG. 9. FIG. 9 shows a helix design for heat exchanger 70 that may be mechanically attached to the cylindrical exterior of compressor 60. The water could be routed through, for example, the outer annulus of the helix.

More specifically, whenever a potable water supply is connected to any other system, it is necessary to keep the potable water safe in the event of a leak or any other problem. Some unique features are needed in order to be compatible with the USPHS requirements for potable water systems. For instance, only certain materials can be used in contact with potable water. Furthermore, a heat exchanger must be designed that will not allow refrigerant or oil to come in contact with the water in case of a failure of the heat exchanger materials.

Figure 6:
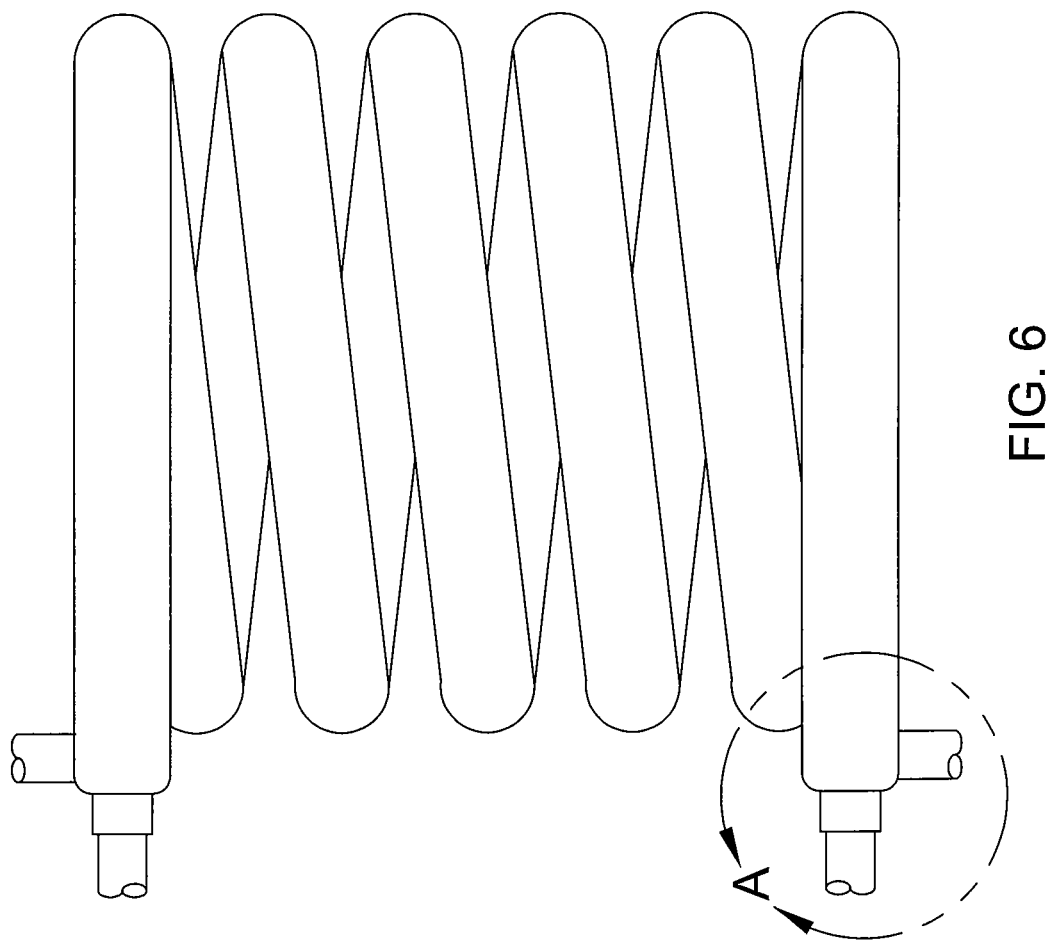
FIG. 6 shows a detailed view of the condenser heat exchanger of FIGS. 2 and 3.
Figure 7:
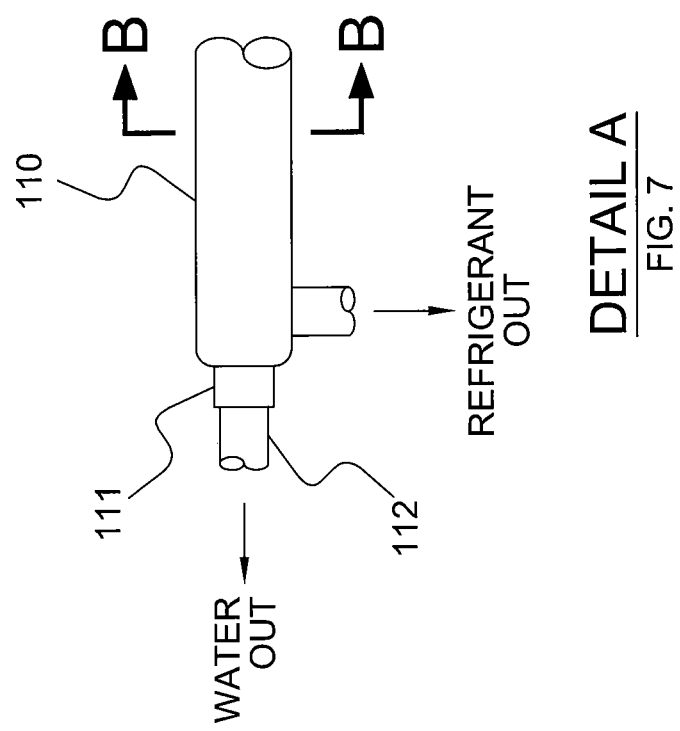
FIG. 7 shows a side plan view of Detail A of FIG. 6, showing various flow channels.
Figure 8:
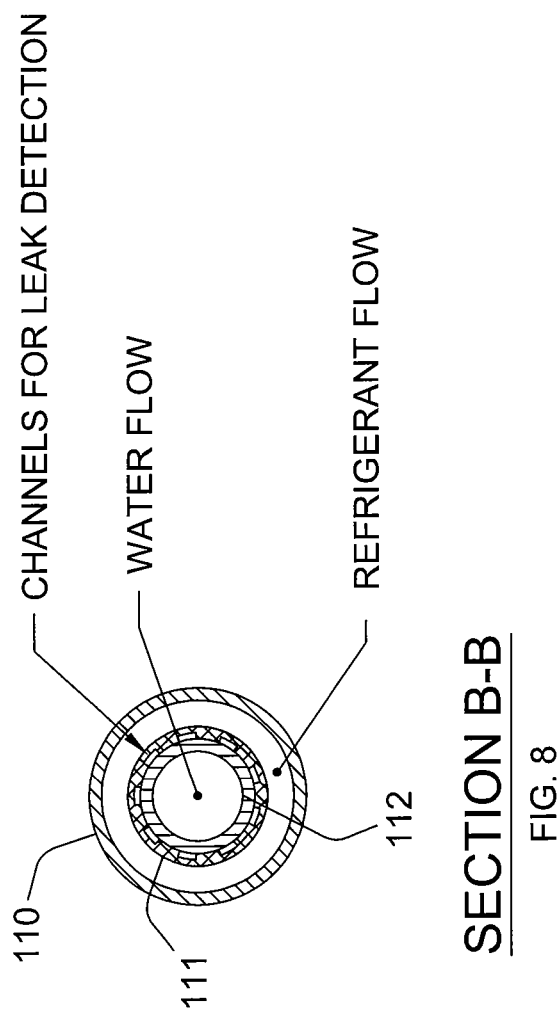
FIG. 8 shows a cross-sectional view of the flow channels of FIG. 7 at Section B-B.

In the condenser heat exchanger designs shown in FIGS. 2-4, the most likely design is to provide an annular configuration of three concentric tubes—an outer tube 100, an intermediate tube 111, and an inner tube 112—formed into a single assembly, as shown in FIGS. 6-8. Water typically travels through the inner tube 112 (the smallest tube) at the center of the assembly. Within the three concentric tubes, the refrigerant typically travels in the annular space between the intermediate tube 111 and the outer tube 110, as shown in FIG. 8. However, it should be understood that the water and refrigerant flow may be changed. The intermediate tube 111 has a crenellated internal diameter 116 created through the use of "rifled" tubing. This forms vent paths that, in normal operation, contain air that is open to ambient.

In the case of a breach of the innermost tube 112, water will escape through the vent path. The water would be noticed during routine operation or maintenance. Additionally, a sensor could be installed that could sense the presence of water and indicate the need for maintenance.

In the case of a breach of the intermediate crenellated tube 111, refrigerant will escape through this vent path. Again, there would be no mixing between water and refrigerant. Depending on the size of leak, the unit could continue to operate for a while. Once the refrigerant is gone (about 2 lb of refrigerant), the unit will become inoperative, and the failure would be noticed and the unit removed for repair. The only way there could be mixing between the water and the refrigerant is if there were a breach of two tube walls at exactly the same time. This is a very improbable event.

For the design in which the heat exchanger 70 is attached to the compressor 60 (FIGS. 5 and 9), water will likely travel in the outermost tube 110 with refrigerant in the inner tube 112. This is to provide cooling for the compressor 60. Again, this may be the flow path used for other embodiments of this invention as well.

This concentric tube configuration may be particularly desirable if the condenser 70 is used in place of the air cooled condenser 46 because the airflow used to cool the condenser 70 also cools the compressor 60. If the fan and motor are eliminated along with the air cooled condenser 46 (as shown in FIGS. 3 and 5), the cooling traditionally supplied to the compressor 60 is no longer provided.

As previously discussed, although embodiments of the invention relating to cooling galley equipment for storing food have been discussed, an additional feature of various embodiments of this invention are that, in addition to cooling food items, the potable water via an air chiller may be used as a heat sink to remove heat from power electronics units, avionics, in-flight entertainment units, and any other heat-generating systems within the aircraft.

An additional feature of various embodiments is that some or all of the heat of rejection may be rejected to the air in the surrounding area in addition to the water loop.

Potable water systems onboard commercial aircraft must also allow for complete draining to ensure against damage from frozen pipes. In cold climates, airlines typically drain the entire water system daily or whenever the aircraft will not be operated for more than a few hours. Therefore, the air chiller 40 should be provided with systems that allow for complete draining of the water within the heat exchanger and associated tubing.

The system should also be designed to prevent the temperature of the potable water in the system from rising too high in order to prevent scalding of passengers or crew. The steady state temperature of the water during flight will be in the range of about 80° to 95° F. This is considered a safe range. Because the potable water may heat up even more during operation after an extended period of time (at approximately one hour of use), particularly during on-ground, transient high temperature conditions prior to the ECS system stabilization, it may be necessary to cool the tap water used for hand washing. Depending on the system design, various safety measures may be used to ensure a maximum water temperature. Temperature sensors and controls may be used to either temporarily reduce the refrigeration provided or to allow for cooling of the water prior to its use. For example, thermoelectric or Peltier Effect cooling may be used. The device could also be controlled by water temperature through thermostat control so that it is on infrequently during transient, on-ground, high temperature conditions. Additionally or alternatively, air flow through the outflow valve 94 of the heat exchanger 90 may be increased.

Another solution may be for the water to be cooled near the point of use with a reservoir or tube finned to dissipate the heat through free or forced convention. The unit may be sized to cool at the rate typically used at each point of use.

Changes and modifications, additions and deletions may be made to the structures and methods recited above and shown in the drawings without departing from the scope or spirit of the invention and the following claims.

What is claimed is:

1. A system for cooling a compartment or device on an aircraft, comprising:
   (a) a potable water tank on-board the aircraft for providing drinkable water;
   (b) an air chiller unit located remotely from the compartment or device to be cooled;
   (c) a first air flow line to deliver chilled air from the air chiller unit to the compartment or device to be cooled;
   (d) a second air flow line to deliver warmed air from the compartment or device to be cooled back to the air chiller unit;
   (e) a first water supply line to deliver potable water from the potable water tank through the air chiller unit so that the potable water absorbs heat from refrigerant in the air chiller unit;
   (f) a second water supply line to deliver heated potable water from the air chiller unit to a heat exchanger unit, where heat from the warmed water is transferred to air; and
   (g) a third air flow line to deliver the warmed air outside the aircraft.

2. The system of claim 1, further comprising a heat exchanger in the air chiller unit that comprises an annular configuration of three concentric tubes for directing potable water and refrigerant flow, and for providing a channel for leak detection.

3. The system of claim 1, wherein the air chiller unit comprises an evaporator comprising a refrigerant fluid that extracts heat from the warmed air that is received from the second air flow line, wherein extracting heat from the warmed air causes the warmed air to become chilled air that is transported back to the compartment or device to be cooled by the first air flow line; and
   a condenser that extracts heat from the refrigerant fluid and directing the heat into the potable water.

4. A system for cooling an area or device in an aircraft, comprising:
   a potable water system comprising:
      a water tank for containing potable water;
      a first supply line for transporting the potable water from the water tank to a vapor compression refrigerating unit; and
      a second supply line;
   the vapor compression refrigerating unit located remotely from the area to be cooled, the vapor compression refrigerating unit comprising:
      an evaporator comprising a refrigerant fluid that extracts heat from warmed air that was warmed by the area or device to be cooled and that is received from a return air ducting line to cause the warmed air to become chilled air that the vapor compression refrigerating unit provides to an air ducting line for transporting the chilled air to the area or device to be cooled; and
      a condenser for extracting the heat from the refrigerant fluid and of directing the heat into the potable water received from the first supply line, such that the potable water is provided from the vapor compression refrigerating unit at a higher temperature that a temperature of the potable water received by the vapor compression refrigerating unit, wherein the second supply line transports the potable water at the higher temperature to an air-to-water heat exchanger that absorbs heat from the potable water at the higher temperature into air such that the potable water exits the air-to-water heat exchange at a lower temperature than the temperature at which it entered the air-to-water heat exchanger, such that the potable water stays contained in the first and second supply lines and does not come in direct contact with components of the vapor compression refrigerating unit; and an outflow valve for expelling from the aircraft the air heated from the higher temperature potable water.

5. The system of claim 4, wherein the area is a galley in the aircraft.

6. The system of claim 4, further comprising a heat exchanger in the vapor compression refrigerating unit that comprises an annular configuration of three concentric tubes for directing water and refrigerant flow, and for providing a channel for leak detection.

7. The system of claim 4, wherein the water tank provides potable water for use to wash hands of a person.

8. A system for performing cooling of a compartment or device on an aircraft, comprising:

(a) an air chiller unit located remotely from the compartment or device to be cooled;
(b) an air ducting line that transports chilled air from the an air chiller unit to the compartment or device;
(c) a return air ducting line that transports warmed air back to the an air chiller unit;
(d) a supply line that directs potable water from a potable water tank to the an air chiller unit, such that the potable water stays contained in the supply line and does not come in direct contact with components of the air chiller unit; and
(e) a condenser system in the air chiller unit that directs heat from the warmed air into the potable water, such that the potable water serves as a heat sink for heat transport.

9. The system of claim 8, wherein the heated potable water is transported to an air to water heat exchanger that receives air from other areas on the transportation vehicle and transfers heat from the heated potable water to the received air.

10. The system of claim 9, wherein heat from the air is expelled from the aircraft and the potable water is transported back to the water tank.

* * * * *